(12) United States Patent
Ikeda

(10) Patent No.: US 8,012,645 B2
(45) Date of Patent: Sep. 6, 2011

(54) SEPARATOR OF FUEL CELL

(75) Inventor: Sadao Ikeda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 627 days.

(21) Appl. No.: 12/086,601

(22) PCT Filed: Nov. 17, 2006

(86) PCT No.: PCT/JP2006/323512
§ 371 (c)(1),
(2), (4) Date: Jun. 16, 2008

(87) PCT Pub. No.: WO2007/069440
PCT Pub. Date: Jun. 21, 2007

(65) Prior Publication Data
US 2009/0169964 A1   Jul. 2, 2009

(30) Foreign Application Priority Data
Dec. 16, 2005   (JP) ................. 2005-363796

(51) Int. Cl.
H01M 2/38   (2006.01)
H01M 8/04   (2006.01)
(52) U.S. Cl. ..................... 429/457; 429/514
(58) Field of Classification Search .............. 429/544, 429/545, 546, 547, 458, 512, 513, 514, 454, 429/455, 456, 457
See application file for complete search history.

(56) References Cited

U.S. PATENT DOCUMENTS

| | | | |
|---|---|---|---|
| 6,544,681 B2 * | 4/2003 | McLean et al. | 429/492 |
| 6,833,214 B2 * | 12/2004 | Funatsu et al. | 429/434 |
| 2005/0186464 A1 * | 8/2005 | Sugiura et al. | 429/38 |
| 2006/0210855 A1 * | 9/2006 | Frank et al. | 429/26 |

FOREIGN PATENT DOCUMENTS

| | | |
|---|---|---|
| DE | 102 43 153 A1 | 5/2003 |
| JP | 58-87769 A | 5/1983 |
| JP | 58-93170 A | 6/1983 |
| JP | 2000-228207 A | 8/2000 |
| JP | 2002-25586 A | 1/2002 |
| JP | 2003-203644 A | 7/2003 |
| JP | 2004-186139 A | 7/2004 |
| JP | 2005-243651 A | 9/2005 |
| WO | WO 03/088378 A2 | 10/2003 |

* cited by examiner

*Primary Examiner* — Jerry A Lorengo
*Assistant Examiner* — Carlos Barcena
(74) *Attorney, Agent, or Firm* — Kenyon & Kenyon LLP

(57) ABSTRACT

A differential pressure in a boundary portion between a streaked or linear fluid channel formed of a plurality of convex and concave portions disposed adjacent to one another in an undulated manner and a distribution channel for distributing a reactant gas or cooling water to be introduced into the plurality of fluid channels is reduced. In a structure of a separator of a fuel cell having a structure including streaked fluid channels formed of adjacent convex and concave portions formed on the surface of the separator, and a distribution channel which distributes, to these fluid channels, a fluid to be introduced into the fluid channels, in a boundary portion between the linear fluid channel and the distribution channel, a position of a terminal end of the convex portion constituting the fluid channel and a position of a terminal end of the concave portion are displaced in a streak direction of the fluid channel. It is preferable that the terminal end of the concave portion is positioned closer to the distribution channel than the terminal end of the convex portion. It is also preferable that the separator has a structure of such a type that front and back surfaces are integrated.

12 Claims, 10 Drawing Sheets

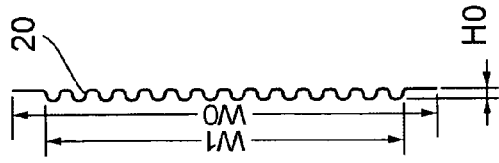
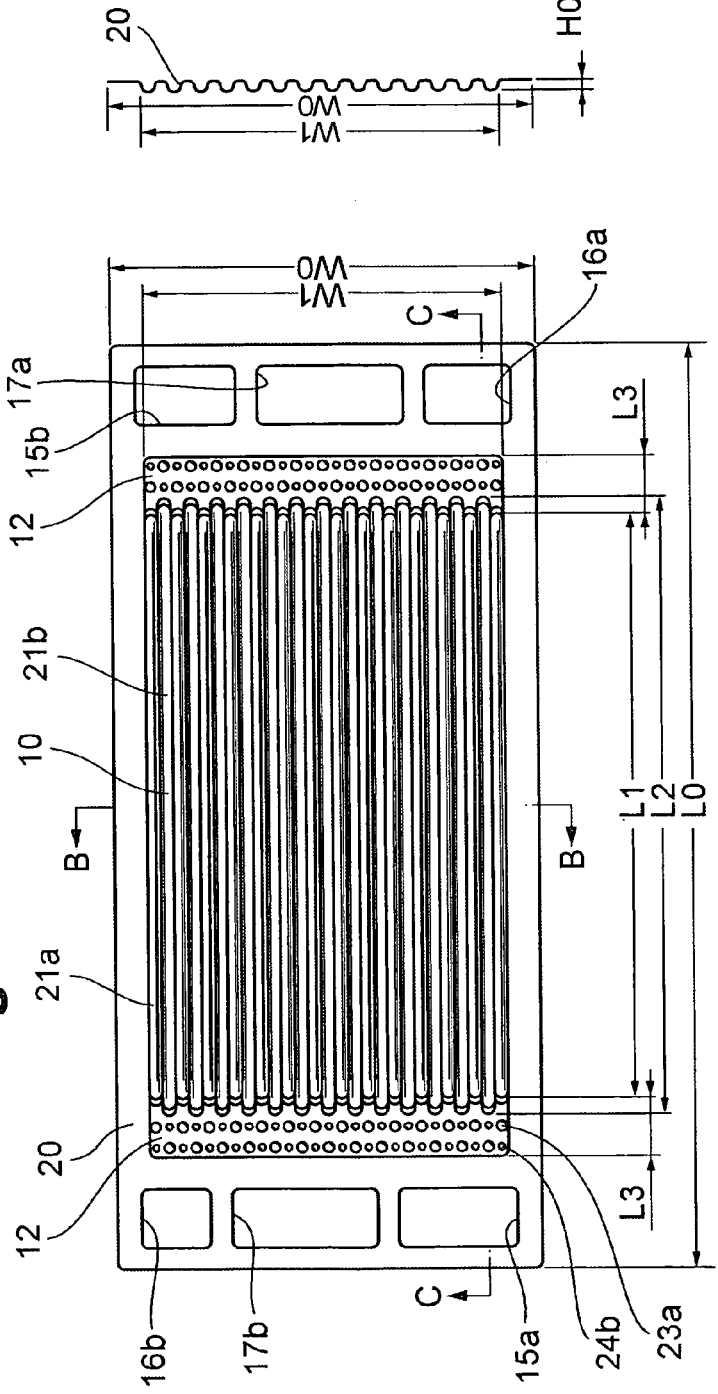

SEPARATOR OF FUEL CELL

This is a 371 national phase application of PCT/JP2006/323512 filed 17 Nov. 2006, which claims priority of Japanese Patent Application No. 2005-363796 filed 16 Dec. 2005, the contents of which are incorporated herein by reference.

BACKGROUND OF THE INVENTION

1. Field of the Invention

The present invention relates to a separator of a fuel cell. More particularly, the present invention relates to a structure of a separator for holding an MEA in which electrodes are provided on opposite sides of an electrolyte.

2. Description of Related Art

As a separator to be applied to a fuel cell, there is known a structure provided with streaked or linear fluid channels formed of a plurality of convex and concave portions arranged adjacent to one another in an undulated form, and a distribution channel for distributing a reactant gas or cooling water to be introduced into these fluid channels (e.g., see Patent Document 1).

[Patent Document 1] Japanese Patent Application Laid-Open No. 2005-243651

SUMMARY OF THE INVENTION

However, in a separator having such a structure, there is a problem that a differential pressure (a pressure loss) especially around a boundary portion between a fluid channel and a distribution channel is large. When the differential pressure around the boundary portion is thus large, problems might be caused with regard to ease of securing a seal property of a fluid and a magnitude of a gas supply pressure (a supply capability).

To solve the problems, an object of the present invention is to provide a separator of a fuel cell having a structure capable of reducing a differential pressure in a boundary portion between streaked or linear fluid channels formed of a plurality of convex portions and concave portions arranged adjacent to one another in an undulated form and a distribution channel for distributing a reactant gas or cooling water to be introduced into these fluid channels.

To solve such problems, the present inventor has performed various investigations. In the investigations, the present inventor has noted a conventional separator structure, especially a structure around a boundary portion between the fluid channels formed in a streaked or linear form and the distribution channel formed so as to come in contact with these fluid channels, and the inventor has found a technology capable of solving such a problem.

The present invention has been developed based on such a finding, and a separator of a fuel cell which is formed so as to circulate a reactant gas or cooling water, comprising: streaked fluid channels formed of adjacent convex and concave portions formed on the surface of the separator; and a distribution channel which distributes, to these fluid channels, a fluid to be introduced toward the fluid channels, wherein a position of a terminal end of the convex portion and a position of a terminal end of the concave portion constituting the fluid channels are displaced in a streak direction of the fluid channel.

The separator having the above-mentioned structure has a structure in which the terminal end position of the convex portion (e.g., a convex rib) is different from that of the concave portion (e.g., a concave groove), in other words, a structure in which a so-called phase of a start end (or a dead end) of the convex portion is different from that of the start end of the concave portion. In this case, an area of an introducing portion, to a gas channel, of the reactant gas flowing, for example, from the distribution channel to the gas channel (or an area of the introducing portion, to a cooling water channel, of the cooling water flowing from the distribution channel to the cooling water channel) can be enlarged. Therefore, as compared with a case where the terminal ends of the convex and concave portions constituting the fluid channel are disposed on the same line without any phase difference as in the conventional example, the differential pressure in the boundary portion between the fluid channel and the distribution channel (the differential pressure which is exerted on the fluid, also referred to as a pressure loss) can be reduced. Therefore, the seal property of the fluid in the fluid channel is easily secured, and the supply pressure (the supply capability) of the reactant gas or the cooling water does not have to be increased as in a conventional structure.

Moreover, in the separator of the fuel cell, a structure is preferable in which the terminal end of the concave portion is positioned closer to the distribution channel than the terminal end of the convex portion. In this case, in a surface provided with the concave and convex portions, the differential pressure with respect to the fluid flowing on the surface is reduced especially around the boundary portion between the distribution channel and the fluid channel.

Furthermore, it is preferable that the separator of the fuel cell has a structure of such a type that front and back surfaces are integrated. In this case, for example, as described above, when the terminal end of the concave portion is positioned closer to the distribution channel than the terminal end of the convex portion, the back surface is provided with a reverse structure in the back surface, that is, the terminal end of the convex portion is positioned closer to the distribution channel than the terminal end of the concave portion. In such a structure, a way of the fluid flowing through the front surface can be varied from that of the fluid flowing through the back surface, so that flow speeds or flow rates of the fluids flowing through the front and back surfaces can be controlled by a separator structure.

Moreover, it is preferable that the distribution channel is provided with a plurality of protrusions. These protrusions function so that the fluid (the reactant gas or the cooling water) flowing through the distribution channel is more equally distributed to the fluid channels. In addition, protrusions of superimposed separators abut on each other, whereby the protrusions function so as to support each other so that this distribution channel is not deformed.

Furthermore, the distribution channel may be one of a fluid return portion, an introducing portion and a discharge portion.

Moreover, the separator of the fuel cell may be a metal separator.

BRIEF DESCRIPTION OF THE DRAWINGS

FIG. 1A is a plan view of a separator showing a structure example of the separator according to a first embodiment of the present invention;

FIG. 1B is a sectional view of the separator cut along the B-B line of FIG. 1A;

FIG. 1C is a sectional view of the separator cut along the C-C line of FIG. 1A;

DETAILED DESCRIPTION OF PREFERRED EMBODIMENT

Figure 2A:
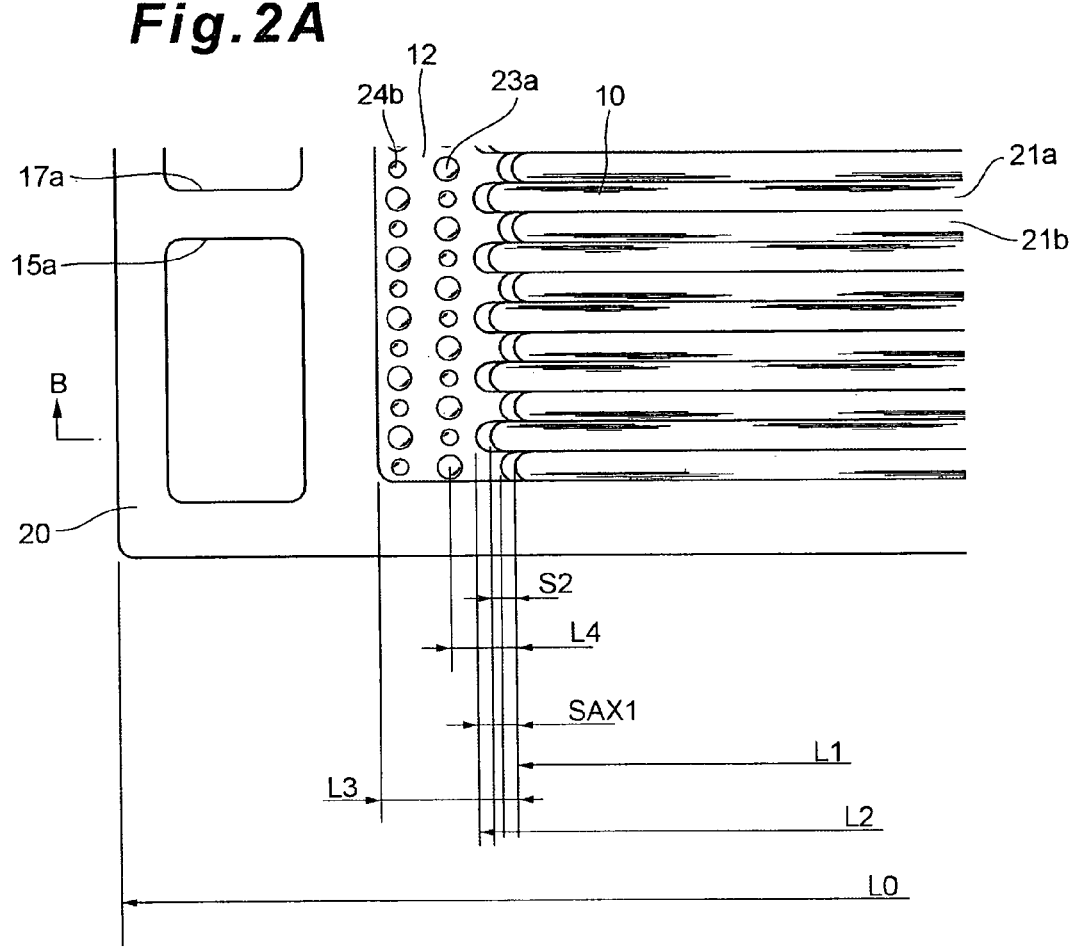
FIG. 2A is a plan view showing an enlarged structure around an oxidizing gas inlet side manifold in the separator shown in FIG. 1A.
Figure 2B:
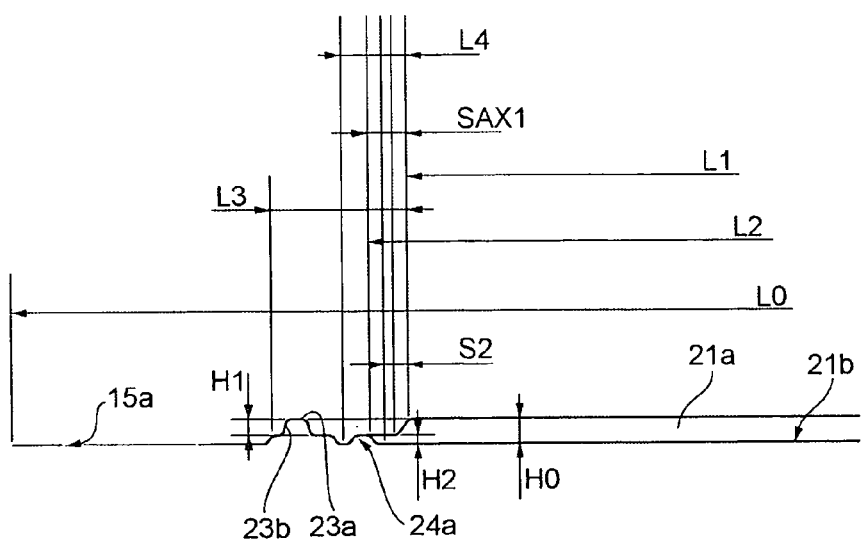
FIG. 2B is a sectional view showing an enlarged structure around an oxidizing gas inlet side manifold in the separator shown in FIG. 1C.

A preferable mode for carrying out the present invention will be described with reference to the drawings. The following embodiments illustrate the present invention, and the present invention is not limited to the following embodiments and can variously be modified and implemented.

FIG. 1A to FIG. 12 show embodiments of a separator of a fuel cell according to the present invention. This separator 20 holds a membrane electrode assembly (MEA) 30 in which electrodes 32a, 32b are provided on opposite sides of an electrolytic film (a polymer electrolytic film) 31, to constitute a fuel cell 1, and has a structure provided with a linear fluid channel which is constituted of a convex portion (a convex rib) 21a including a linear rib and a concave portion (a concave groove) 21b including a groove and which supplies a fluid, and a distribution channel 12 constituted of a flat surface positioned at a height between the convex portion 21a and a concave portion 21b. The following embodiments are characterized in that a position of a terminal end of the convex portion 21a is different from that of a terminal end of the concave portion 21b with respect to a line vertical to a flow direction of the linear fluid channel in a boundary portion between the linear fluid channel and the distribution channel 12 in the separator 20 of this fuel cell 1.

In the following embodiments, first a schematic constitution of a stack 3 constituting the fuel cell 1 will be described, and then a structure of the separator 20 will be described in detail (see FIG. 12, etc.). It is to be noted that the separator 20 of the fuel cell 1 described in the present embodiment is provided with the fluid channel of a straight type or a serpentine type, and a fluid inlet or a fluid outlet of these fluid channels is provided with the distribution channel (a distributing portion) 12 for distributing a fluid to a plurality of fluid channels.

Figure 12:
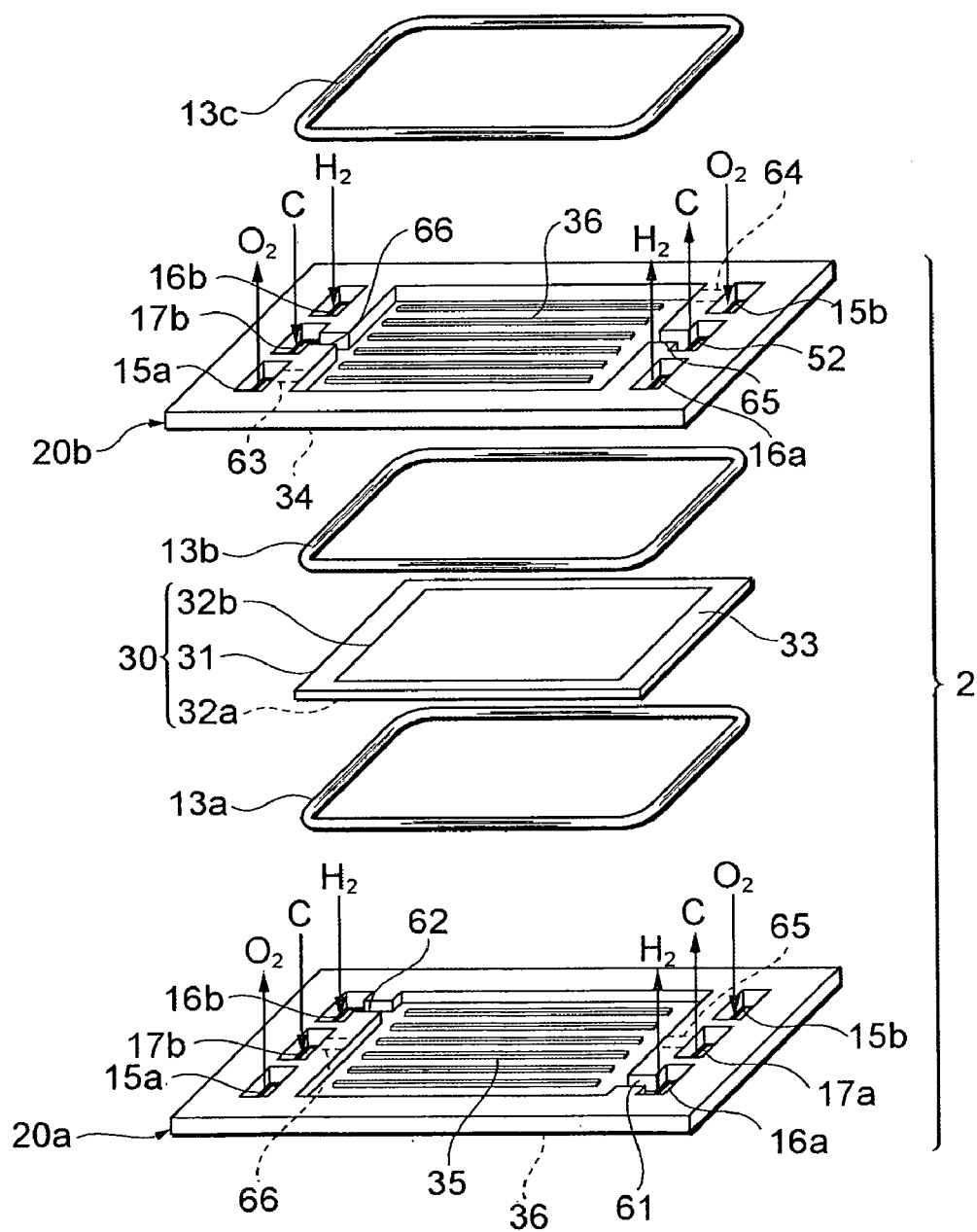
FIG. 12 is a perspective view showing an exploded unitary cell of a fuel cell according to the embodiments of the present invention.

FIG. 12 shows a schematic constitution of a cell 2 of the fuel cell 1 in the present embodiment. It is to be noted that the fuel cell 1 constituted by laminating these cells 2 is usable as a vehicle-mounted power generation system of, for example, a fuel cell hybrid vehicle (FCHV), but the fuel cell is not limited to this example, and the fuel cell may be used as a power generation system or the like to be mounted on a self-propelled body such as any type of mobile body (e.g., a ship, an airplane or the like) or a robot.

The cell 2 is constituted of the MEA 30 and a pair of separators (denoted with reference numerals 20a, 20b in FIG. 12) which hold the MEA 30 therebetween (see FIG. 12). The MEA 30 and the separators 20a, 20b are substantially formed into a rectangular plate-like shape. Moreover, an outer shape of the MEA 30 is formed to be slightly smaller than outer shapes of the separators 20a, 20b. Furthermore, portions around the MEA 30 and the separators 20a, 20b are molded of a molding resin together with a first seal member 13a and a second seal member 13b.

The MEA 30 is constituted of the polymer electrolytic film (hereinafter also referred to simply as the electrolytic film) 31 including an ion exchange film of a polymer material, and a pair of electrodes 32a, 32b (an anode and a cathode) which hold both surfaces of the electrolytic film 31. Among these components, the electrolytic film 31 is formed to be slightly larger than the electrodes 32a, 32b. This electrolytic film 31 is bonded to the electrodes 32a, 32b by, for example, a hot press process in a state in which a peripheral edge portion 33 is left.

The electrodes 32a, 32b constituting the MEA 30 are constituted of, for example, a porous carbon material (a diffusion layer) which carries a catalyst such as platinum attached to the surface of the material. A hydrogen gas is supplied as a fuel gas to one electrode (the anode) 32a, and an oxidizing gas such as air or an oxidizing agent is supplied to the other electrode (the cathode) 32b. These two types of gases cause an electrochemical reaction in the MEA 30, to obtain an electromotive force of the cell 2.

The separators 20a, 20b are constituted of a conductive material which is impermeable to the gas. Examples of the conductive material include carbon, a hard resin having conductivity, and a metal such as aluminum or stainless steel. A base of the separators 20a, 20b of the present embodiment is formed of a plate-like metal (metal separators), and surfaces of this base on electrodes 32a, 32b sides are provided with films (e.g., membranes plated with gold) having excellent resistance to corrosion.

Moreover, both the surfaces of the separators 20a, 20b are provided with groove-like channels constituted of a plurality of concave portions. In a case where the base of the separators 20a, 20b of the present embodiment is made of, for example, the plate-like metal, these channels can be formed by press forming. The groove-like channels formed in this manner constitute a gas channel 34 of the oxidizing gas, a gas channel 35 of the hydrogen gas and a cooling water channel 36. More specifically, a plurality of gas channels 35 of the hydrogen gas are formed in an inner surface of the separator 20a on the electrode 32a side, and a plurality of cooling water channels 36 are formed in a back surface (an outer surface) of the separator (see FIG. 12). Similarly, a plurality of gas channels 34 of the oxidizing gas are formed in an inner surface of the separator 20b on the electrode 32b side, and a plurality of cooling water channels 36 are formed in a back surface (an outer surface) of the separator (see FIG. 12). For example, in the present embodiment, these gas channels 34 and the gas channels 35 are formed in parallel with each other in the cell 2. Furthermore, in the present embodiment, in a case where two cells 2,2 are arranged adjacent to each other so that the outer surface of the separator 20a of the one cell 2 is attached to the outer surface of the separator 20b of the adjacent cell 2, the cooling water channels 36 of both the cells are integrated to form a channel having, for example, a rectangular section (see FIG. 10, FIG. 12). It is to be noted that a peripheral portion between the separator 20a and the separator 20b of the adjacent cells 2, 2 is molded of a molding resin.

Moreover, around an end of the separator 20a or 20b in a longitudinal direction (in the vicinity of one end shown on the left in FIG. 12 as one faces, in the present embodiment), a manifold 15a of the oxidizing gas on an inlet side, a manifold 16b of the hydrogen gas on an outlet side, and a manifold 17b of cooling water (denoted with a symbol C in FIG. 12) on the outlet side are formed. For example, in the present embodiment, these manifolds 15a, 16b and 17b are formed of substantially rectangular or trapezoidal through holes provided in the separators 20a, 20b (see FIG. 6, FIG. s12). Furthermore, an opposite end of the separator 20a or 20b is provided with a manifold 15b of the oxidizing gas on the outlet side, a manifold 16a of the hydrogen gas on the inlet side, and a manifold 17a of the cooling water on the inlet side. In the present embodiment, these manifolds 15b, 16a and 17a are also formed of substantially rectangular or trapezoidal through holes (see FIG. 6, FIG. 12).

Among the above-mentioned manifolds, the inlet manifold 16a and the outlet manifold 16b for the hydrogen gas in the separator 20a are connected to the gas channels 35 of the hydrogen gas via an inlet communication passage 61 and an outlet communication passage 62 formed in a groove-like shape in the separator 20a, respectively. Similarly, the inlet manifold 15a and the outlet manifold 15b for the oxidizing gas in the separator 20b are connected to the gas channels 34 of the oxidizing gas via an inlet communication passage 63 and an outlet communication passage 64 formed in a groove-like shape in the separator 20b, respectively (see FIG. 12). Furthermore, the inlet manifold 17a and the outlet manifold 17b for the cooling water in the separator 20a or 20b are connected to the cooling water channels 36 via an inlet communication passage 65 and an outlet communication passage 66 formed in a groove-like shape in the separator 20a or 20b, respectively. According to the constitution of the separators 20a, 20b described above, the oxidizing gas, the hydrogen gas and the cooling water are supplied to the cell 2. Here, a specific example will be described. For example, the hydrogen gas passes through the communication passage 61 from the inlet manifold 16a of the separator 20a to flow into the gas channel 35 for use in power generation of the MEA 30. Afterward, the hydrogen gas passes through the communication passage 62, and is discharged to the outlet manifold 16b.

Both of the first seal member 13a and the second seal member 13b are members having a frame-like shape and formed into substantially the same shape (see FIG. 12). In these members, the first seal member 13a is provided between the MEA 30 and the separator 20a, and more specifically interposed between the peripheral edge portion 33 of the electrolytic film 31 and a portion of the separator 20a around the gas channel 35. The second seal member 13b is provided between the MEA 30 and the separator 20b, and more specifically interposed between the peripheral edge portion 33 of the electrolytic film 31 and a portion of the separator 20b around the gas channel 34.

Furthermore, a frame-like third seal member 13c is provided between the separator 20b and the separator 20a of the adjacent cells 2, 2 (see FIG. 12). This third seal member 13c is a member provided so as to be interposed between a portion of the separator 20b around the cooling water channel 36 and a portion of the separator 20a around the cooling water channel 36, thereby sealing between these portions. Incidentally, in the cell 2 of the present embodiment, among various passages (34 to 36, 15a, 15b, 16a, 16b, 17a, 17b and 61 to 66) of the fluids in the separators 20a, 20b, the inlet manifolds 15a, 16a and 17a and the outlet manifolds 15b, 16b and 17b of various fluids are passages positioned outside the first seal member 13a, the second seal member 13b and the third seal member 13c (see FIG. 12).

Next, a structure of the separator in the present embodiment (denoted with the reference numerals 20a, 20b in the above description, but sometimes simply denoted with reference numeral 20 in the following description) will be described in detail (see FIG. 1A, etc.). The separator 20 is provided with a fluid channel of a straight or serpentine type, and inlets and outlets of a plurality of channels are further provided with distribution channels (distributing portions) 12 for distributing the fluid to the fluid channels. A linear portion (this is also referred to as a linear channel in the present specification) of the fluid channel is constituted of linear convex portion 21a and concave portion 21b, and the distribution channel 12 is constituted of a flat surface at a position lower than the convex portion 21a and higher than the concave portion 21b. For example, in the present embodiment, the convex portion 21a is constituted of a rib having a protruding shape (hereinafter referred to as the "convex rib", and this is denoted with reference numeral 21a), and the concave portion 21b is constituted of a groove having a recessed shape (hereinafter referred to as the "concave groove", and this is denoted with reference numeral 21b). It is to be noted that one separator 20 is formed so that a section of the separator has an undulated form. A back surface of the convex rib 21a is provided with the concave groove 21b, and a back surface of the concave groove 21b is provided with the convex rib 21a so that front and back surfaces are integrally formed (see FIG. 10). Moreover, the fluid mentioned herein is, for example, the cooling water in the surface where the separators 20 face each other, and the fluid is a reactant gas such as the oxidizing gas or the fuel gas in the surface where the separator 20 faces the MEA 30. It is to be noted that in the present specification, it is described that the gas channel or the cooling water channel 36 constituted of the convex rib 21a and the concave groove 21b is linear, but the linear form mentioned herein is not a straight form only. In short, it is meant that the plurality of fluid channels are formed to be adjacent to one another, thereby forming a so-called streaked form. Moreover, the gas channel mentioned herein is the gas channel 34 of the oxidizing gas or the gas channel 35 of the hydrogen gas, that is, a channel of the reactant gas, and the channel is denoted with reference numeral 10 in FIG. 2A and the like.

Furthermore, the above separator 20 is characterized in a structure in which a position of a terminal end of the convex rib 21a is different from that of a terminal end of the concave groove 21b with respect to a line vertical to a flow direction of the linear channel in a boundary portion between these linear channels and the distribution channel 12. In other words, a structure is characteristic in which with regard to a plurality of convex portions 21a and concave portions 21b repeatedly formed adjacent to one another so as to form the gas channel 10, phases of the terminal ends of the convex portions 21a and the terminal ends of the concave portions 21b are successively displaced. First to fourth embodiments of such a structure of the separator 20 will hereinafter separately be described.

First Embodiment

First, FIG. 1A to FIG. 1C show a separator 20 provided with a straight type gas channel 10. As described above, ends of this separator 20 are provided with inlet manifolds 15a, 16a and 17a and outlet manifolds 15b, 16b and 17b of various fluids (an oxidizing gas, a fuel gas and cooling water). Moreover, both ends of the gas channel 10 are provided with distribution channels 12 for distributing a gas to the gas channels 10 (see FIG. 1A, FIG. 2A, etc.). It is to be noted that a portion where the gas discharged from the gas channel 10 joins will also be referred to as the distribution channel 12 in the present embodiment. That is, in this case, the distribution channel 12 does not substantially distribute the gas, but has a symmetric structure, and the gas can be supplied in either direction. Therefore, in the present embodiment, both the portions are referred to as the "distribution channels" for the sake of convenience.

Figure 11:
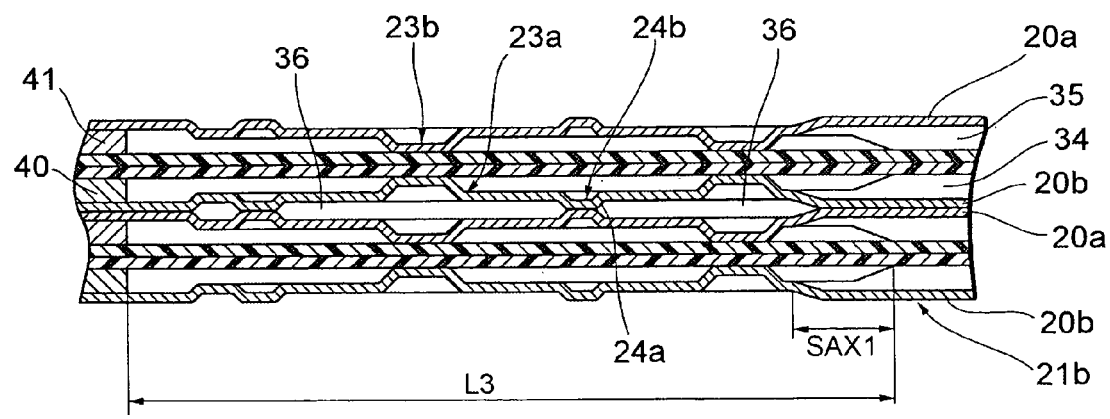
FIG. 11 is a sectional view showing a structure example of a distribution channel portion in a case where the MEA and the separator are laminated.

This distribution channel 12 is provided with a plurality of protrusions 23a formed during, for example, press molding, and other protrusions 24a raised on a side opposite to the protrusions 23a (see FIG. 1A, FIG. 2A, etc.). Among these protrusions, the protrusions 23a protrude on the same side (e.g., a front surface side) as the convex ribs 21a, and are formed so as to have a height H1 equal to a height of this convex rib 21a (see FIG. 2A to FIG. 2C). This protrusion 23a collides with the surface of an MEA 30 to secure a region for supplying the gas between the MEA 30 and the separator 20 (see FIG. 11). Moreover, the protrusions 24a protrude on the same side (e.g., a back surface side) as a recessed side of the concave grooves 21b, and are formed so as to have a height H2 equal to a height of the convex rib 21a formed on the back surface of this concave groove 21b so that front and back surfaces are integrated (see FIG. 2A to FIG. 2C). This protrusion 24a collides to the protrusion 24a of the adjacent separator 20 to secure a region (a cooling water channel 36) for supplying the cooling water between two separators 20 (see FIG. 11). It is to be noted that it is preferable to arrange these protrusions 23a, 24a with equal intervals as in the present embodiment from a viewpoint that regions for supplying various gases or the cooling water are held with equal intervals to achieve constant ease of flowing (see FIG. 1A, etc.). Moreover, back surfaces of the protrusions 23a, 24a are provided with dimples 23b, 24b simultaneously formed during, for example, press molding, respectively (see FIG. 11, etc.). It is to be noted that reference numerals 40, 41 in FIG. 11 are insulating members, respectively.

Figure 4:
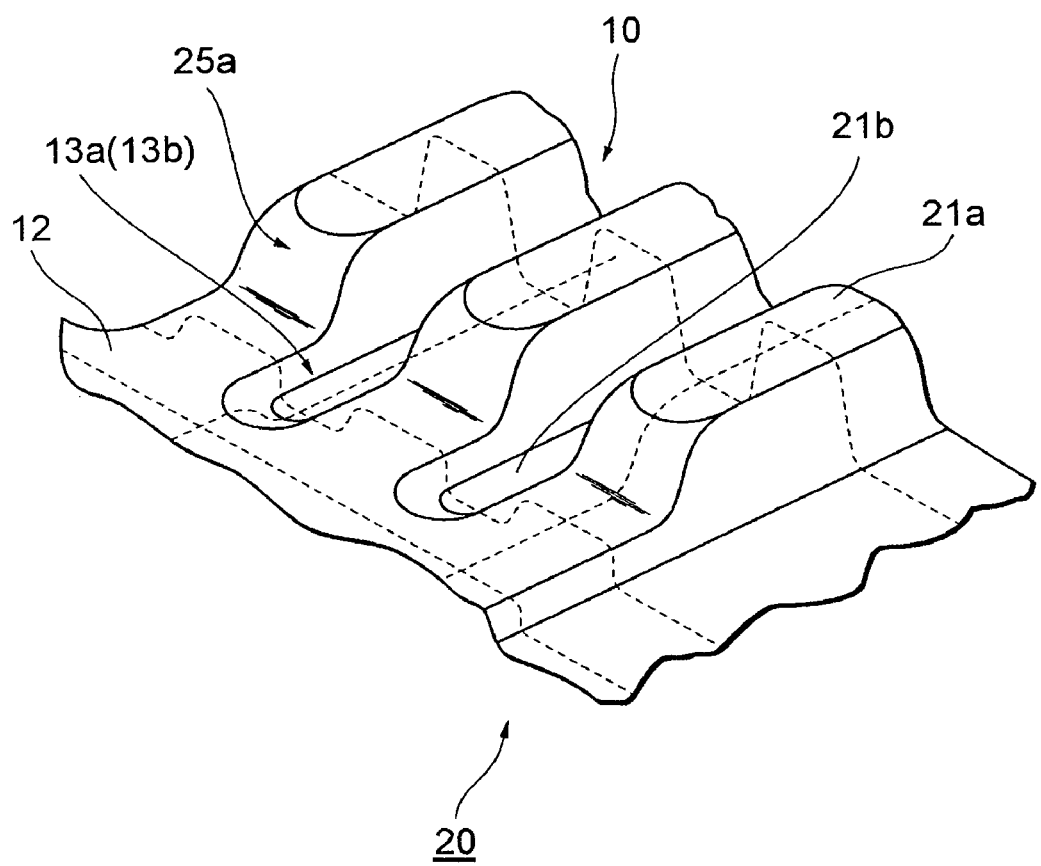
FIG. 4 is a perspective view showing a structure around the terminal ends of the convex rib and the concave groove in the first embodiment of the present invention.

The convex rib 21a and the concave groove 21b have a structure in which positions of portions as terminal ends are different from each other in a back-and-forth direction in a boundary portion between a linear channel and the distribution channel 12 (see FIG. 4). One example of such a structure will specifically be described as follows, while lengths of portions are denoted with symbols.

That is, in the separator 20 having a total length L0 in a longitudinal direction and a total width W0, in the present embodiment, a total length of the convex rib 21a is L1, whereas a total length of the concave groove 21b is L2 longer than the total length of the rib (L2>L1) in a structure in which a terminal end of the concave groove 21b is positioned closer to the distribution channel 12 than a terminal end of the convex rib 21a (see FIG. 1A to FIG. 1C). Here, the convex rib 21a and the concave groove 21b shown in the present embodiment are symmetrically formed with respect to the center line as a reference, so that eventually, the concave groove 21b in one end of the separator 20 is formed to be longer than the convex portion 21a as much as SAX1=(L2−L1)/2 (see FIG. 2A to FIG. 3D).

Moreover, a structure around the terminal ends of the convex rib 21a and the concave groove 21b in the present embodiment will be described in more detail (see FIG. 2A to FIG. 4). First, the terminal end portion of the convex rib 21a is provided with a tilt portion (denoted with 25a in FIG. 4) having a length S3 in the longitudinal direction (see FIG. 3A to 4). As apparent from FIG. 3A to FIG. 3D, a total length portion of the convex rib 21a having the length L1 does not include this tilt portion 25a. Moreover, the terminal end portion of the concave groove 21b is provided with a tilt portion (denoted with 25b in FIG. 3A, FIG. 3D). As apparent from FIG. 3A and the like, this tilt portion 25b is included in a total length of the concave groove 21b having the length L2. It is to be noted that symbol S2 shown in FIG. 3D is a length obtained by subtracting the length of the tilt portion 25b in the terminal end portion of the concave groove 21b from a differential length (=SAX1 described above) between the terminal end position of the concave groove 21b and the terminal end position of the convex rib 21a.

Figures 3B, 3C:
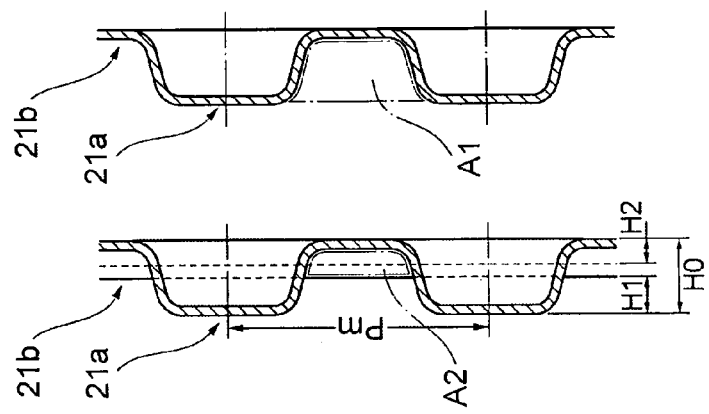
FIG. 3B is a sectional view cut along the B-B line of FIG. 3A.
FIG. 3C is a sectional view cut along the B-B line of FIG. 3A and showing an area of a traverse section of a gas introducing portion.
Figure 3A:
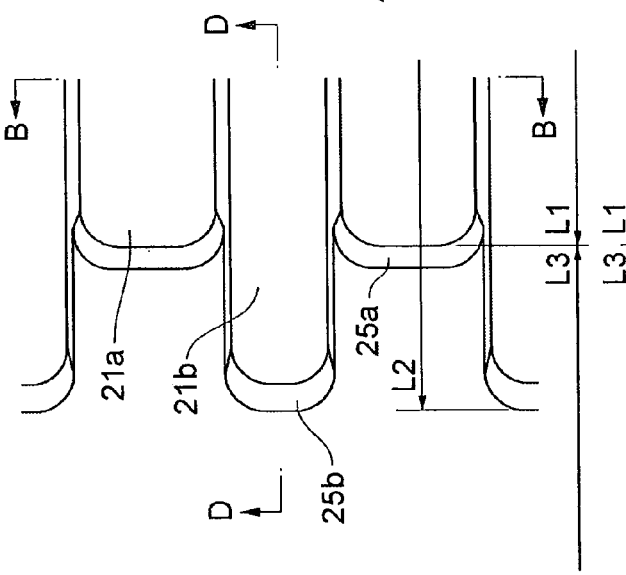
FIG. 3A is a plan view showing a structure around terminal ends of a convex rib and a concave groove in the first embodiment of the present invention.
Figure 3D:
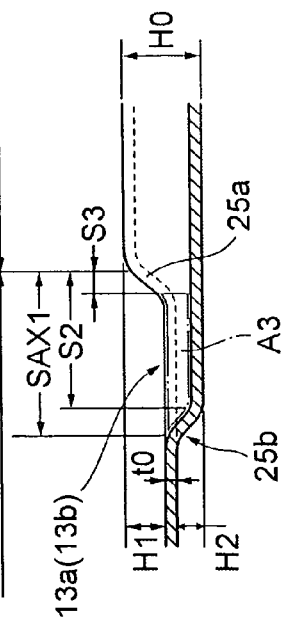
FIG. 3D is a sectional view cut along the D-D line of FIG. 3A.

It is to be noted that, in addition, a total thickness of the separator 20 is denoted with a symbol H0 (see FIG. 3B, FIG. 3D). This thickness H0 is a value (H0=t0+H1+H2) obtained by adding up a plate thickness t0 of a plate material constituting the separator 20, the protruding height H1 of the above-mentioned convex rib 21a and the protrusion 23a and the protruding height H2 of the above-mentioned back surface convex rib 21a and the protrusion 24a. Furthermore, a space between the convex rib 21a and the adjacent convex rib 21a (or a space between the concave groove 21b and the adjacent concave groove 21b) is denoted with a symbol Pm (see FIG. 3B).

In the separator 20 having the above-mentioned structure, a total length L2 of the concave groove 21b is set to be longer than a total length L1 of the convex rib 21a, whereby a gas introducing portion 13a is formed (see FIG. 4). In such a case, a gas flowing through the distribution channel 12 is easily introduced into the gas channel (the linear channel) 10 through this gas introducing portion 13a, so that a differential pressure (the differential pressure exerted to a fluid, and this may be referred to as the "pressure loss") in a boundary portion between the distribution channel 12 and the linear channel is reduced. In addition, the "pressure loss" indicates that energy such as the pressure of the fluid is consumed owing to a shape of the fluid channel, smoothness of the surface of the fluid channel or the like.

It is to be noted that in the present embodiment, an extended portion of the gas channel 10 formed in a terminal end of the concave groove 21b is referred to as the gas introducing portion 13a only for the sake of convenience. For example, in a case where the gas in the gas channel 10 flows in reverse, the gas is discharged from the gas introducing portion 13a. In this case, this portion is exactly referred to as the "gas discharge portion", depending on a direction of the flow of the gas. In short, according to the separator 20 of the present embodiment, the differential pressure in the boundary portion between the linear channel and the distribution channel 12 can be suppressed and reduced regardless of whether the portion is the introducing portion or the discharge portion of the gas.

Moreover, the gas-side protruding height H1 and the cooling-water-side protruding height H2 in the separator 20 having the above-mentioned structure can be set to various values with reference to proportionally distributed dimensions of the reactant gas and the cooling water in the distribution channel 12 (i.e., dimensions in a case where quantities are distributed at a ratio proportional to a reference quantity), but in the present embodiment, the heights are set so as to satisfy the following relation between both the heights (see FIG. 3B, FIG. 3D).

$$H1 > H2 \quad \text{[Formula 1]}$$

That is, the separator 20 shown in FIG. 3B and the like has a structure in which the gas-side protruding height H1 is larger than the cooling-water-side protruding height H2. In this case, the differential pressure in the boundary portion between the linear channel and the distribution channel 12 can preferably be suppressed and further reduced.

Moreover, it has been described with reference to FIG. 2A to FIG. 3D that the concave groove 21b in one end of the separator 20 is formed so as to be longer than the convex portion 21a as much as SAX1=(L2−L1)/2. However, from a viewpoint that the differential pressure in the boundary portion between the linear channel and the distribution channel 12 is further reduced, this SAX1 is preferably set to a value larger than a constant value. One example of the present embodiment is as follows.

$$SAX1 > 3 \cdot t0 \quad \text{[Formula 2]}$$

That is, a magnitude (a length) of SAX1 is set to a value three or more times the plate thickness t0 of the separator 20, whereby the gas introducing portion 13a having a predetermined length (or a predetermined area) or more is secured in the separator 20 having a plate thickness t0. In such a case, the differential pressure in the boundary portion between the linear channel and the distribution channel 12 can effectively be reduced to a certain degree or less. In addition, in a case where a dimension between the held MEAs 30 is reduced, in other words, in a case where the total thickness H0 of the separator 20 is reduced, when SAX1 is set as described above, the separator 20 can effectively be minimized while reducing the differential pressure.

Furthermore, the following setting is preferable. That is, a structure preferably satisfies the following relations:

$$A2/A1 > 0.4; \text{ and} \quad \text{[Formula 3]}$$

$$A3 > A2, \quad \text{[Formula 4]}$$

in which A3 is an area of a portion (i.e., a portion showing a vertical section of the gas introducing portion 13a) shown by a one-dot chain line in FIG. 3D, A2 is an area of a portion (i.e., a portion showing a sectional area of the concave groove 21b) shown by a one-dot chain line in FIG. 3C, and A1 is an area of a portion (i.e., a portion showing a transverse section of the gas introducing portion 13a) shown by a one-dot chain line in FIG. 3B. In this case, similarly, the differential pressure in the boundary portion between the linear channel and the distribution channel 12 can be reduced to a certain degree or less. It is to be noted that in this case, the total length L2 of the concave groove 21b is longer (L2>L1) is longer than the total length L1 of the convex rib 21a in the same manner as described above.

It is to be noted that a configuration for reducing the differential pressure has been described in accordance with an example in which the oxidizing gas or the fuel gas is introduced into the gas channel 10, but conversely, a structure for reducing the differential pressure can be provided in a case where the cooling water is introduced from the distribution channel 12 to the linear channel. This structure will hereinafter be described as a second embodiment.

Second Embodiment

Figure 5A:
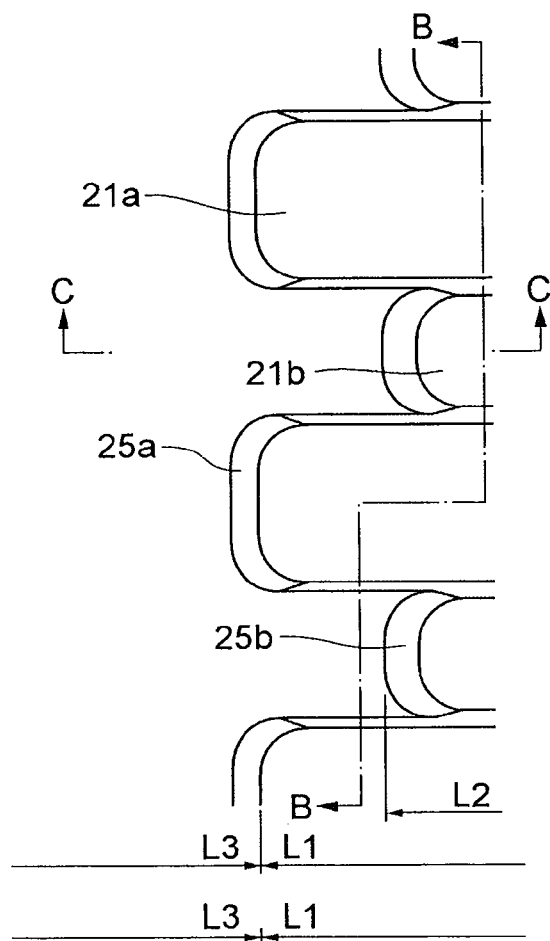
FIG. 5A is a plan view showing a structure around terminal ends of a convex rib and a concave groove in a second embodiment of the present invention.
Figure 5B:
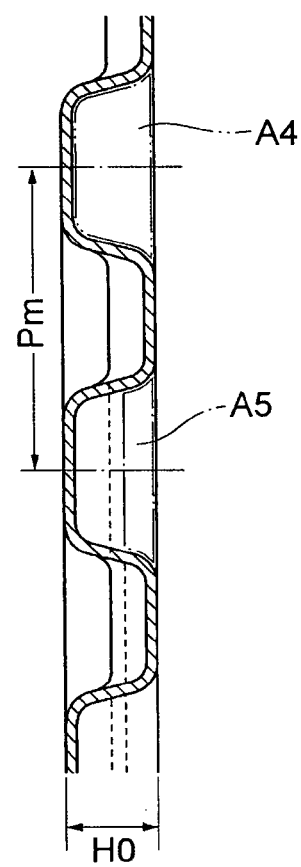
FIG. 5B is a sectional view cut along the B-B line of FIG. 5A.
Figure 5C:
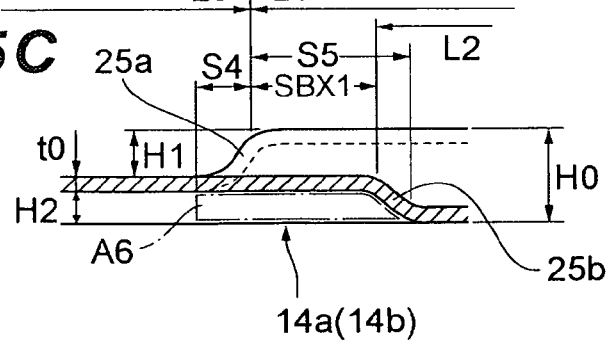
FIG. 5C is a sectional view cut along the C-C line of FIG. 5A.

FIG. 5A to FIG. 5C show one example of a structure for reducing a differential pressure in a case where cooling water is introduced from a distribution channel 12 to a linear channel. Contrary to the separator shown in FIG. 3A and the like, this separator 20 satisfies a relation L1>L2. That is, a total length L2 of a concave groove 21b is shorter than a total length L1 of a convex rib 21a, and a terminal end of the convex rib 21a is positioned closer to the distribution channel 12 than a terminal end of the concave groove 21b (see FIG. 5A to FIG. 5C). Here, the convex rib 21a and the concave groove 21b are formed symmetrically with respect to center lines, respectively, and hence eventually, the convex rib 21a in one end of the separator 20 of the present embodiment is formed to be longer than the concave groove 21b as much as SBX1=(L1−L2)/2 (see FIG. 5A, etc.).

Moreover, a structure around the terminals of the convex rib 21a and the concave groove 21b in the present embodiment will be described in more detail (see FIG. 5A, etc.). First, a terminal end portion of the convex rib 21a is provided with a tilt portion 25a having a length S4 in a longitudinal direction (see FIG. 5A, etc.). As apparent from FIG. 5A and the like, a total length portion of the convex rib 21a having the length L1 does not include this tilt portion 25a. Moreover, a terminal end portion of the concave groove 21b is also provided with a tilt portion (denoted with symbol 25b in FIG. 5A, FIG. 5C). As apparent from FIG. 5A and the like, this tilt portion 25b is included in the total length L2 of the concave groove 21b. It is to be noted that symbol S5 in FIG. 5C is a length obtained by adding the length of the tilt portion 25b in the terminal end portion of the concave groove 21b to a differential length (=SAX1 described above) between a terminal end position of the convex rib 21a and a terminal end position of the concave groove 21b.

Furthermore, the separator 20 has a total thickness H0 in the same manner as in the above-mentioned embodiment (see FIG. 5B, FIG. 5C). This thickness H0 is a value (H0=t0+H1+H2) obtained by adding up a plate thickness t0 of a plate material constituting the separator 20, a protruding height H1 of the above-mentioned convex rib 21a and a protruding height H2 of the concave groove 21b on the side of a back surface. Furthermore, a space between the convex rib 21a and the adjacent convex rib 21a (or a space between the concave groove 21b and the adjacent concave groove 21b) is denoted with a symbol Pm (see FIG. 5B).

The separator 20 having the above-mentioned structure has an advantage that a gas introducing portion 13a having a broad introduction region as described above is not formed as viewed from a side provided with a gas channel 10, but a reverse structure is provided as viewed from the back surface of the gas channel 10, that is, as viewed from the surface on the side of a cooling water channel 36. That is, on the side of the cooling water, a so-called cooling water introducing portion (denoted with symbol 14a in FIG. 5C) is formed in the same manner as in the gas introducing portion 13a of the first embodiment described above. Therefore, a differential pressure in a boundary portion between a linear channel and the distribution channel 12 on the side of the cooling water can be suppressed and reduced.

It is to be noted that the gas-side protruding height H1 and the cooling-water-side protruding height H2 in the separator 20 having the above-mentioned structure can be set to various values with reference to proportionally distributed dimensions of a gas and the cooling water in the distribution channel 12, but in the present embodiment, the heights are set so as to satisfy the following relation between both the heights (see FIG. 5C).

$$H1 > H2 \quad \text{[Formula 5]}$$

That is, in the separator 20 shown in FIG. 5C and the like, the gas-side protruding height H1 is larger than the cooling-water-side protruding height H2. In consequence, the differential pressure in the boundary portion between the linear channel and the distribution channel 12 can be suppressed and further reduced.

Moreover, the following setting is preferable. That is, a structure preferably satisfies the following relations:

$$A5/A4 > 0.2; \text{ and} \quad \text{[Formula 6]}$$

$$A6 > A5, \quad \text{[Formula 7]}$$

in which A6 is an area of a portion (i.e., a portion showing a vertical section of the cooling water introducing portion 14a) shown by a one-dot chain line in FIG. 5C), A5 is an area of a portion (i.e., a portion showing a transverse section of the cooling water introducing portion 14a) shown by a one-dot chain line in FIG. 5B, and A4 is an area of a portion (i.e., a portion showing a transverse section of the cooling water channel 36) shown by a two-dot chain line in FIG. 5B. In this case, similarly, the differential pressure in the boundary portion between the linear channel (the cooling water channel 36) of the cooling water and the distribution channel 12 can be reduced to a certain degree or less. It is to be noted that in this case, the total length L1 of the convex rib 21a is longer (L1>L2) is longer than the total length L2 of the concave groove 21b in the same manner as described above.

It is to be noted that in the above-mentioned first and second embodiments, a structure is provided in which one of the total length L1 of the convex rib 21a and the total length L2 of the concave groove 21b is lengthened, and the other length is shortened (see FIG. 1A, etc.), but this is merely one example, an a configuration in which a terminal end position of the convex rib 21a is different from that of the concave groove 21b is not limited to this example. Another example will be described. In a structure, while the total length L1 of the convex rib 21a is equal to the total length L2 of the concave groove 21b, one position (the convex rib 21a) may relatively be displaced from the other position (the concave groove 21b) in a channel direction. In such a case, the one end of a front surface can be provided with the gas introducing portion 13a, and the other end of a back surface can be provided with the cooling water introducing portion 14a, so that a flow direction of the gas (an oxidizing gas or a fuel gas) and a flow direction of the cooling water may be varied in the front and back surfaces, and the differential pressures of the gas and the cooling water can be reduced.

Third Embodiment

Next, a case where the present invention is applied to a separator 20 having serpentine type channels will be described (see FIG. 6, FIG. 7).

Figure 6:
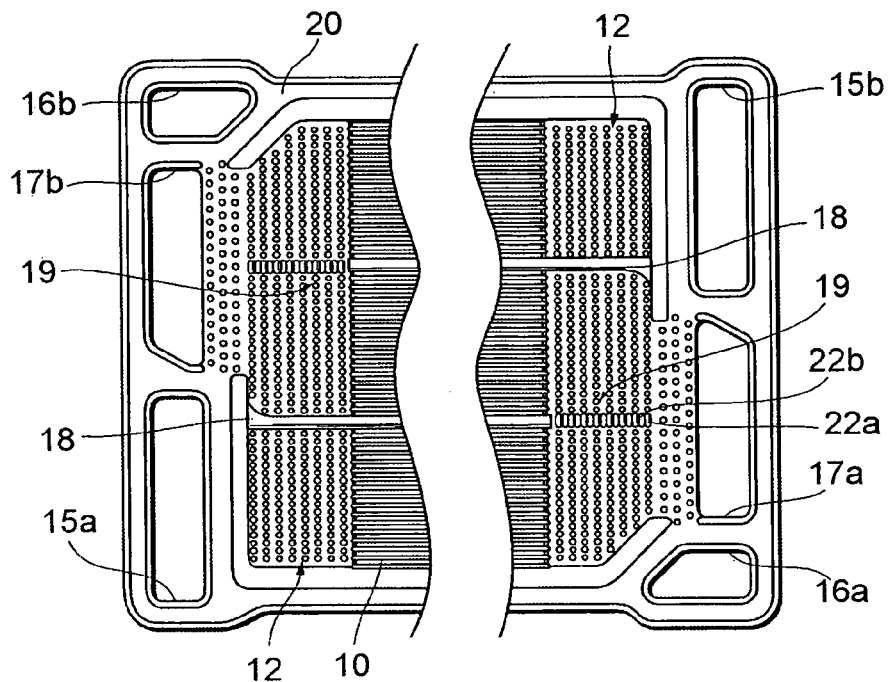
FIG. 6 is a plan view showing a structure example of a separator in a third embodiment of the present invention.
Figure 7:
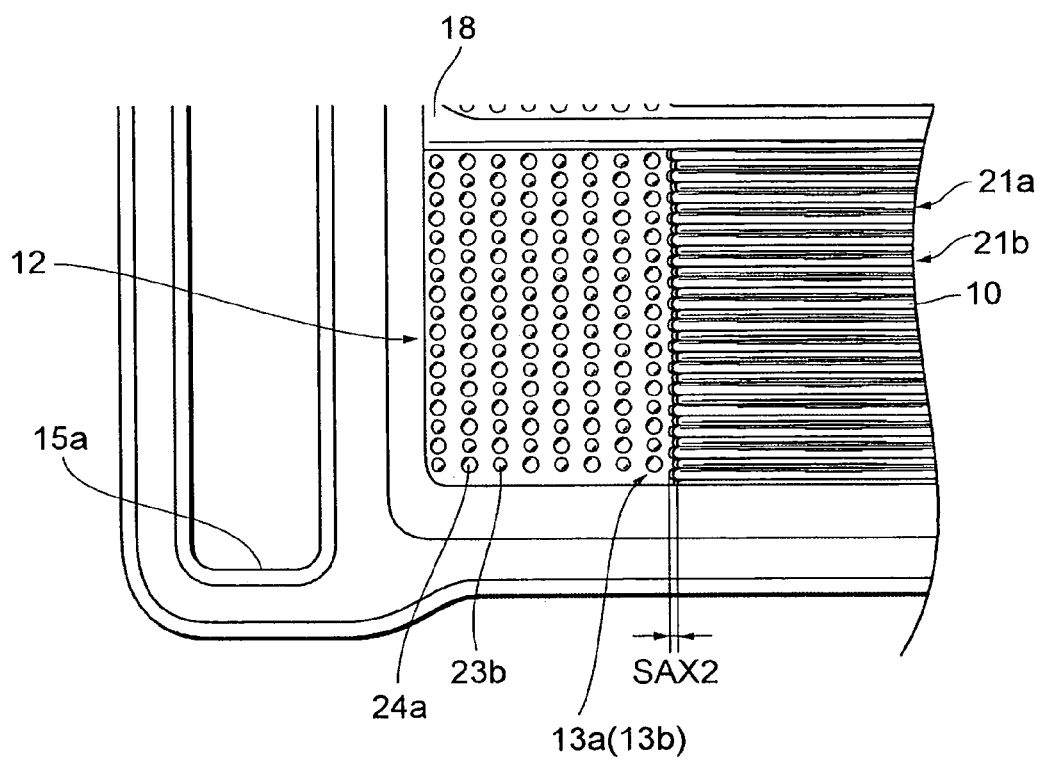
FIG. 7 is a diagram showing an enlarged structure around an oxidizing gas inlet side manifold in the separator shown in FIG. 6.
Figure 8:
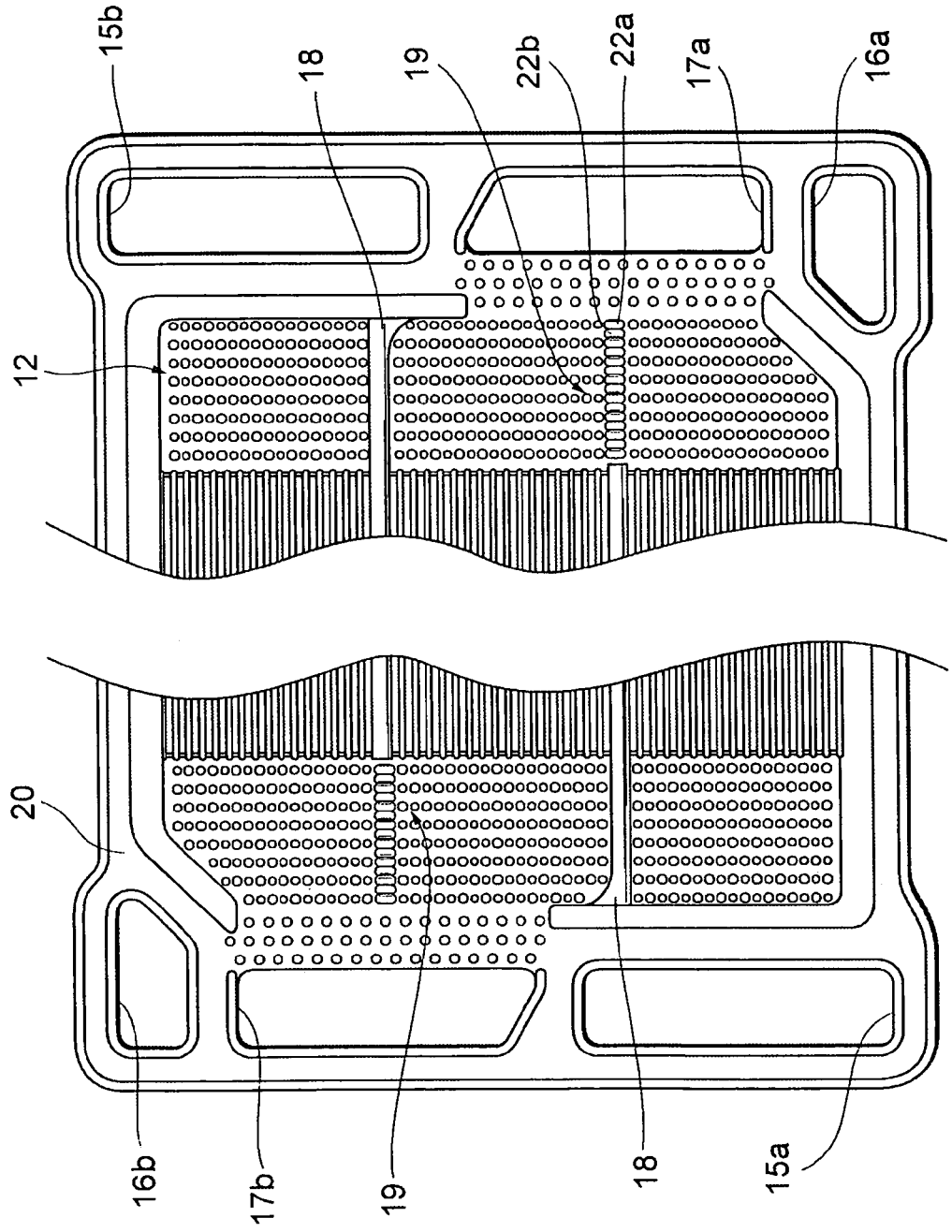
FIG. 8 is a plan view showing a structure example of a separator in a fourth embodiment of the present invention.
Figure 9:
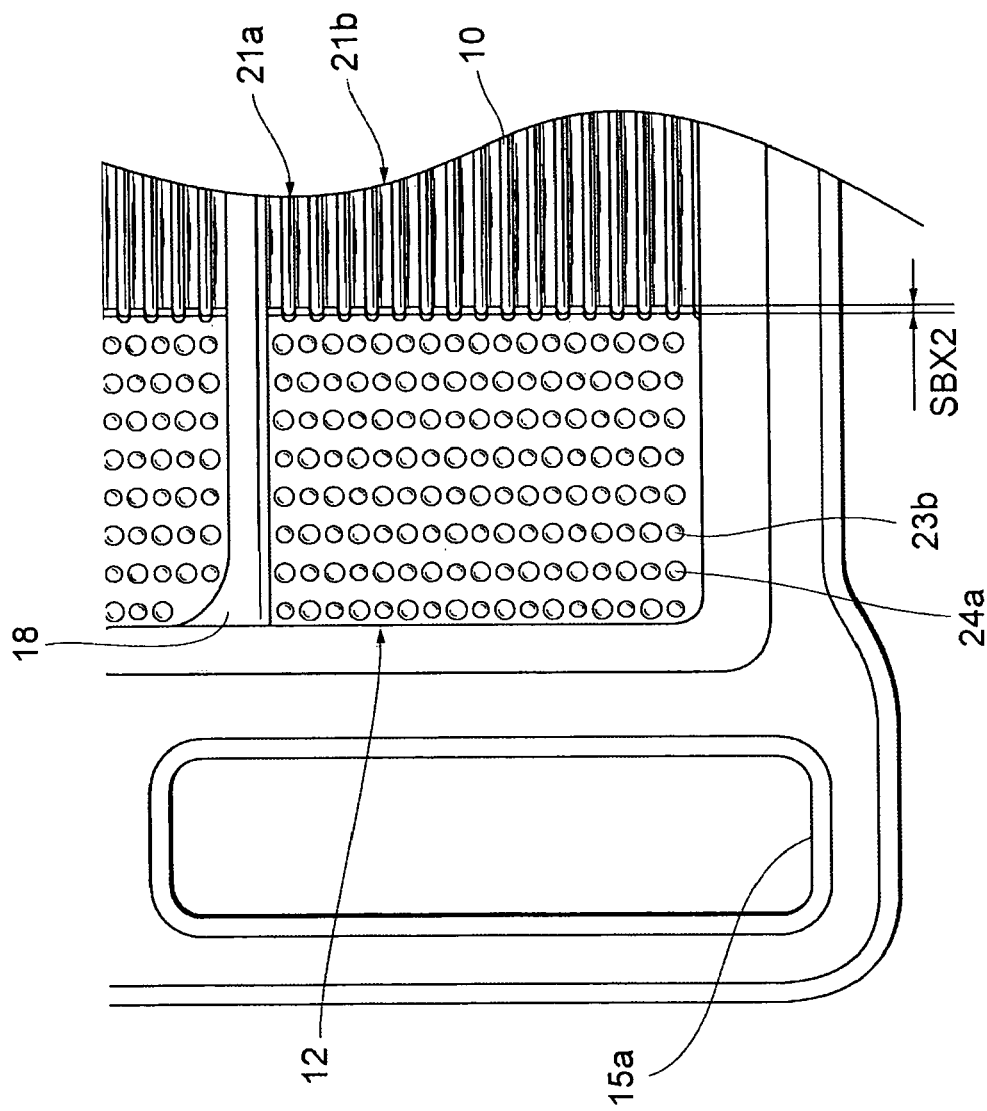
FIG. 9 is a diagram showing an enlarged structure around an oxidizing gas inlet side manifold in the separator shown in FIG. 8.
Figure 10:
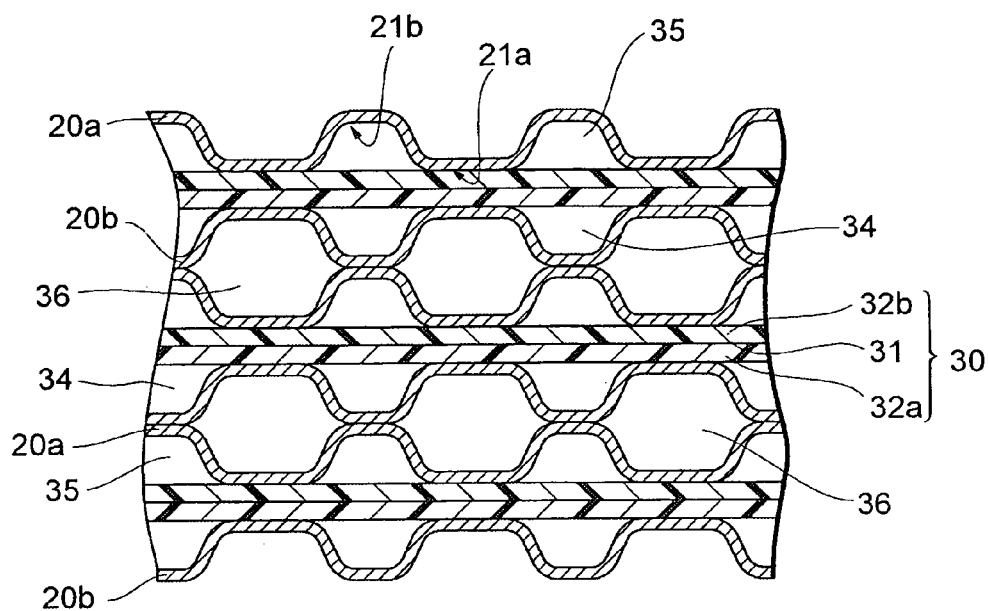
FIG. 10 is a sectional view showing a structure example of a linear channel portion in a case where an MEA and a separator are laminated.

FIG. 6 and FIG. 7 show one example of the serpentine type separator 20 viewed from the side of a gas (an oxidizing gas or a fuel gas) channel 10. Ends of this separator 20 are provided with inlet manifolds 15a, 16a and 17a and outlet manifolds 15b, 16b and 17b of various fluids (the oxidizing gas, the fuel gas and cooling water) in the same manner as in the above embodiments (see FIG. 6). In the separator 20 of the present embodiment, distribution channels 12 of the gases are provided in the vicinities of the inlet manifolds 15a, 16a and 17a and the outlet manifolds 15b, 16b and 17b of various fluids (the oxidizing gas, the fuel gas and the cooling water), respectively, and a plurality of straight gas channels 10 (and cooling water channels 36) constituted of a plurality of parallel convex ribs 21a and concave grooves 21b are provided between these distribution channels 12 provided on these opposite ends (see FIG. 6). In the distribution channel 12, protrusions 23a which protrude toward a surface provided with the gas channel 10 and dimples 24b formed on back surfaces of protrusions 24a which protrude toward a surface provided with the cooling water channel 36 are alternately arranged (see FIG. 6, FIG. 7). Moreover, in the distribution channel 12 and the straight type gas channel 10, two rows of gas block convex portions 18 parallel to the gas channels 10 are provided in a mutually offset state, whereby a serpentine type channel having two return portions 19 are formed (see FIG. 6). A convex portion 22a and a concave portion 22b alternately formed along an extension of the formed rib-like gas block convex portion 18 toward the return portion 19, whereby the gas (the oxidizing gas or the fuel gas) flows through the convex portion 22a and a gap between the convex portions 22a or a plurality of arranged convex portions 22a along the extensions (see FIG. 6). The plurality of gas channels 10 on a back surface side are provided with the cooling water channels 36 (with the proviso that the cooling water channels are omitted from FIG. 6 and FIG. 7), and gas inlet and outlet of the gas channel 10 and cooling water inlet and outlet of the cooling water channel 36 are provided with the distribution channels 12, respectively.

Even in such a serpentine type separator 20, according to the present embodiment, a boundary portion between the gas channel 10 (and the cooling water channel 36) and the distribution channel 12 has a structure in which a terminal end position of the convex portion 21a is displaced from that of the concave portion 21b. That is, the position of a terminal end of the convex rib 21a is different from that of the terminal end of the concave groove 21b with respect to a line vertical to a flow direction of a fluid channel (the gas channel 10 and the cooling water channel 36) (see FIG. 7, etc.).

Here, in the same manner as in the first embodiment, the present embodiment has a structure in which a total length (L2) of the concave groove 21b is longer than a total length (L1) of the convex rib 21a. Moreover, a gas inlet portion to the concave groove 21b is provided with a gas introducing portion 13a, and a gas outlet portion is provided with a gas discharge portion 13b, respectively (see FIG. 7, etc.). In such a case, the gas flowing through the distribution channel 12 is easily introduced into the gas channel 10 through this gas introducing portion 13a, so that a differential pressure in the boundary portion between the distribution channel 12 and the gas channel 10 is reduced. Moreover, shapes and structures of the convex rib 21a and the concave groove 21b are provided with so-called phases in this manner, whereby stepped concave and convex portions are reduced to about a half especially in rising portions (in other words, portions around the gas introducing portion 13a and the gas discharge portion 13b) of the convex rib 21a and the concave groove 21b. As a result, a molding property of the separator 20 improves in the same manner as in the above embodiments.

Fourth Embodiment

A configuration has been described in a case where the serpentine type separator 20 is provided with the introducing portion 13a of the gas (the hydrogen gas or the fuel gas) or the gas discharge portion 13b, but the same serpentine type separator 20 may be provided with a cooling water introducing portion 14a and the like. That is, in the same manner as in, for example, the second embodiment described above, a structure can be provided in which a total length L2 of a concave groove 21b is shorter than a total length L1 of a convex rib 21a, and a terminal end of the convex rib 21a is positioned closer to the distribution channel 12 than a terminal end of the concave groove 21b (see FIG. 8, FIG. 9). This separator 20 has an advantage that the gas introducing portion 13a having a large introduction region is not formed as viewed from a side provided with a gas channel 10 (see FIG. 9, etc.), but a reverse structure is provided as viewed from a back surface of the gas channel 10, that is, the surface of a cooling water channel 36. That is, on a cooling water side, a cooling water introducing portion (denoted with symbol 14a in, for example, FIG. 5C) similar to the gas introducing portion 13a described in the above embodiment is formed. Therefore, according to the separator 20 having such a structure, a differential pressure in a boundary portion between a linear channel and a distribution channel 12 on the cooling water side can be suppressed and reduced.

With regard to the separator 20 constituting the fuel cell 1, various embodiments of the structure in which the terminal end position of the convex rib 21a is displaced from that of the adjacent concave groove 21b have been described. According to the above-mentioned separator 20, in any embodiment, the gas or the cooling water is easily introduced into the linear channel through the gas introducing portion 13a or the cooling water introducing portion 14a, so that the effect that the differential pressure in the boundary portion between the distribution channel 12 and the linear channel can be reduced is obtained.

In addition, according to the separators 20 described above, not only the differential pressure reduction effect but also the effect that the molding property of the separator 20 improves are obtained. That is, in a conventional structure, the terminal end positions of the convex rib and the concave groove are aligned, so that the stepped concave and convex portions are large in the terminal end positions. Therefore, during molding, a material is not completely supplied around the terminal end position, whereby creases are sometimes increased. Therefore, a high precision is demanded during the molding, and cost sometimes increases. On the other hand, in the present embodiment having the structure in which the terminal end position is displaced, the stepped concave and convex portions in the terminal end positions of the convex rib 21a and the concave groove 21b are suppressed, so that the material is easily supplied as compared with the conventional structure. Therefore, there are advantages that any crease is not easily generated and that any crack around the terminal end positions is not easily generated. As a result, during the molding, unlike the conventional structure, a strict precision is not required, and an effect that the molding property of the separator 20 improves Such an effect that the molding property improves or an effect due to this effect will hereinafter be described in more detail.

That is, first, a structure of a conventional separator has a plurality of gas grooves each including a flat peripheral portion and the center constituted of concave and convex portions. In a groove end, tilt angles of the concave and convex portions are set so that a difference between a blunt angle and an acute angle is made for every other groove or four grooves. While the gas is returned using a space formed in a gentle slope (a blunt tilt surface) in the groove, short-circuit of the gas on a downstream side is suppressed (e.g., see Japanese Patent Application Laid-Open No. 2002-2558). Moreover, in a transverse section of the gas channel, an outer surface has a flat portion, and a radius R of curvature of a bent portion (hereinafter referred to as a shoulder or a shoulder portion) is constant. Moreover, the whole upper or lower bottom portion sometimes has a constant radius of curvature.

In addition, according to such a structure, it is difficult to secure a seal property in the gas return portion and the peripheral portion, and it is difficult to completely eliminate gas leak, so that continuous grooves cannot be constituted. Alternatively, a function such as the seal property cannot be secured, and a desired performance is sometimes not obtained. For example, in a case where a remarkably thin plate having a plate thickness of 0.1 mm is formed, even when a shoulder radius (shoulder R) of a mold with respect to the shoulder portion of a molded article is set to zero, the shoulder R is twice or more the plate thickness owing to an appearance of a molded article. Therefore, this portion is thinned and has an acute angle. As a result, it is very difficult to completely seal the portion by use of a seal plate. In addition, in a case where materials of members which abut on each other are different, coefficients of thermal expansion are different. It is to be noted that when the seal plate is additionally deteriorated, the seal property cannot be secured. In such a case, the gas leak of the gas return portion or the like has a large influence, and sometimes causes power generation unevenness.

On the other hand, in the separator 20 of the present embodiment, as described above, the phase of the terminal end position of the convex rib 21a is different from that of the terminal end position of the concave groove 21b, so that the stepped portion is small, and irregularity is suppressed. Therefore, the structure is easily molded as compared with the conventional structure. According to the structure, unlike the conventional structure, it is prevented that the shoulder portion is thinned and has the acute angle, so that there is an advantage that the structure has an excellent gas seal property. Therefore, there is little influence of the gas leak of the gas return portion or the like, and generation of the power generation unevenness can be suppressed.

Secondly, in the conventional structure, the gas rapidly turns at the gentle slope of the gas return portion to raise the differential pressure. For example, in the serpentine type, the number of turns in the channel increases, so that the differential pressure of the whole channel sometimes becomes very high. That is, in the gas return portion, a flow speed on an inner track side is large, and the differential pressure is high, so that a difference of a gas flow rate around the slope is large, and the gas flow rate is sometimes maximized especially at the shoulder portion of the slope. In this case, the MEA is damaged by the differential pressure at this high speed as compared with another portion, and sometimes has poor durability. Moreover, when the differential pressure of the whole channel is very high, a required supply capability or more of a gas supply unit is necessary, so that eventually an efficiency of the whole fuel cell system lowers. Furthermore, in the serpentine type or the like, a continuous channel substantially having a single stroke is formed, which causes problems that formed water increases on conditions of a high load and that in a case where blockage occurs, the differential pressure has to be increased to eliminate the blockage. Therefore, a supply unit having a larger supply capability is sometimes necessary.

On the other hand, in the separator 20 of the present embodiment, the phases of the terminal end positions of the convex rib 21a and the concave groove 21b are varied as described above. As a result, especially the differential pressure in the boundary portion between the linear channel and the distribution channel 12 can be reduced. Therefore, it is prevented that the differential pressure of the gas return portion or the whole channel increases, and eventually, unlike the conventional structure, the MEA is not damaged. Moreover, the gas supply unit having a supply capability lower than that of the conventional structure can be used, so that the efficiency of the whole fuel cell system can be improved.

Thirdly, in the conventional structure, from a viewpoint that the gas short-circuit in the slope of the gas return portion be inhibited, the slope needs to have an acute-angle shape (a shape such as a right-angled shape) which is as less round as possible, and additionally, a return shape is necessary. However, in actual, a material of a root portion of the slope of the return portion is compressed, and creases and warp are easily generated owing to a stress of the material, which causes a problem that thinning and breakage during the molding, and molding distortion cannot be avoided. Therefore, in a conventional method, when a groove pitch is fine (e.g., about ten times a plate pressure t of about 0.1 mm), it is difficult to perform pressing owing to the breakage and thinning of the shoulder portion of the convex portion, the creases of the root portion or the like.

On the other hand, in the separator 20 of the present embodiment, as described above, the irregularity in the terminal end positions of the convex rib 21a and the concave groove 21b is suppressed as described above. Therefore, unlike the conventional structure, the material is easily supplied, the creases are not easily generated, and cracks around the terminal end positions are not easily generated. Therefore, during the molding, the generation of the thinning and breakage, the molding distortion or the like can be inhibited. Moreover, as a result, even in the continuous gas channel as in the conventional structure, press molding with a fine groove pitch can be performed, and an effect that a degree of freedom in a groove shape of the separator 20 improves is obtained.

Furthermore, fourthly, the shoulder R of the gas return portion is sometimes smaller than that of the convex portion for suppressing the short-circuit of the gas. In this case, an MEA holding dimension (a width during the holding of the MEA) sometimes increases. When the holding dimension of the MEA increases in this manner, peeling of a diffusion layer of the MEA, falling of a catalyst or the like occurs, depending on an environmental difference of the fuel cell 1. There is also a problem that performance and durability of the MEA remarkably lower.

On the other hand, in the separator 20 of the present embodiment, the phases of the terminal end positions of the convex rib 21a and the concave groove 21b are varied as described above, and eventually, it can be prevented that the position of the shoulder R of the gas return portion is the same and that the holding dimension becomes excessively large. As a result, the holding dimension of the MEA can be minimized, so that there is an effect that the durability of the MEA can be inhibited from deteriorating.

It is to be noted that the above embodiment is one preferable embodiment of the present invention, but the present invention is not limited to this embodiment, and can variously be modified and implemented within the scope of the present invention. For example, in the above embodiments, the separator 20 of such a type that the front and back surfaces are integrated has been described, but this is merely one example of a preferable configuration, and the present invention is applicable even to another structure, that is, a separator having a structure in which the front and back surfaces are integrated.

Moreover, in the above embodiments, the separator made of a metal (a metal separator) has been described, but an application target of the present invention is not limited to this example, and the present invention is applicable even to, for example, another type of separator such as a carbon separator.

INDUSTRIAL APPLICABILITY

According to the present invention, a differential pressure in a boundary portion between a streaked or linear fluid channel formed of convex and concave portions and a distribution channel for distributing a reactant gas or cooling water to be introduced into the plurality of fluid channels can be reduced.

Therefore, the present invention is broadly applicable to a separator of a fuel cell demanded in this manner.

The invention claimed is:

1. A separator of a fuel cell which is formed so as to circulate a reactant gas or cooling water, comprising:
   streaked fluid channels formed of adjacent convex and concave portions formed on the surface of the separator; and
   a distribution channel which distributes, to these fluid channels, a fluid to be introduced toward the fluid channels, wherein:
   a position of a terminal end of at least one of the convex portions and a position of a terminal end of at least one of the concave portions constituting the fluid channels are displaced in a streak direction of the fluid channel and have different phases,
   the terminal end of each of the concave portions is positioned closer to the distribution channel than the terminal end of each of the convex portions,
   the distribution channel is provided with a plurality of press-molded protrusions, and the plurality of protrusions are disposed on a metal plate, and
   the separator has a structure of such a type that front and back surfaces are integrated, and is made of a metal.

2. The separator of the fuel cell according to claim 1, wherein the distribution channel is one of a fluid return portion, an introducing portion and a discharge portion.

3. The separator of the fuel cell according to claim 2, wherein the convex portion is a convex rib, and the concave portion is a concave groove.

4. The separator of the fuel cell according to claim 3, wherein a total length of the concave groove is longer than a total length of the convex rib.

5. The separator of the fuel cell according to claim 3, wherein terminal ends of the convex rib and the concave portion are provided with tilt portions.

6. The separator of the fuel cell according to claim 5, wherein the concave portion circulates the reactant gas therethrough.

7. The separator of the fuel cell according to claim 6, wherein a protruding height H1 of the convex portion on the side of the reactant gas is higher than a protruding height H2 of another convex portion on the side of the cooling water in a back surface of the separator.

8. The separator of the fuel cell according to claim 5, wherein the concave portion circulates the cooling water therethrough.

9. The separator of the fuel cell according to claim 8, wherein a protruding height H1 of the convex portion on the side of the reactant gas is higher than a protruding height H2 of another convex portion on the side of the cooling water in a back surface of the separator.

10. The separator of the fuel cell according to claim 1, wherein a total length of the concave portion is substantially equal to a total length of the convex portion, and a position of the convex portion is relatively displaced in a streak direction of the fluid channel with respect to a position of the concave portion.

11. The separator of the fuel cell according to claim 10, wherein a terminal end portion of the concave portion positioned closer to the distribution channel than the terminal end of the adjacent convex portion in a front surface of the separator is an introducing portion of the reactant gas, a terminal end portion of the concave portion positioned closer to the distribution channel than the terminal end of the adjacent convex portion in a back surface of the separator is an introducing portion of the cooling water, and flow directions of the reactant gas and the cooling water are varied in the front and back surfaces of the separator.

12. The separator of the fuel cell according to claim 1, wherein the streaked fluid channels formed of adjacent convex and concave portions formed only in parallel.

* * * * *

UNITED STATES PATENT AND TRADEMARK OFFICE
CERTIFICATE OF CORRECTION

PATENT NO.           : 8,012,645 B2
APPLICATION NO.      : 12/086601
DATED                : September 6, 2011
INVENTOR(S)          : Sadao Ikeda It is certified that error appears in the above-identified patent and that said Letters Patent is hereby corrected as shown below:

| Column | Line |   |
|--------|------|---|
| 5 | 29 | Change "FIG. s12)." to --FIG. 12).--. |
| 11 | 36 | Delete "is longer". |
| 11 | 43 | After "example," change "an" to --and--. |
| 17 | 7 | Change "the terminal end" to --a terminal end--. |
| 18 | 1 | Change "the terminal end" to --a terminal end--. |

Signed and Sealed this
Nineteenth Day of June, 2012

David J. Kappos
*Director of the United States Patent and Trademark Office*